June 24, 1941.   G. H. STIMSON   2,246,865
METHOD OF FORMING TAPS
Original Filed April 27, 1938
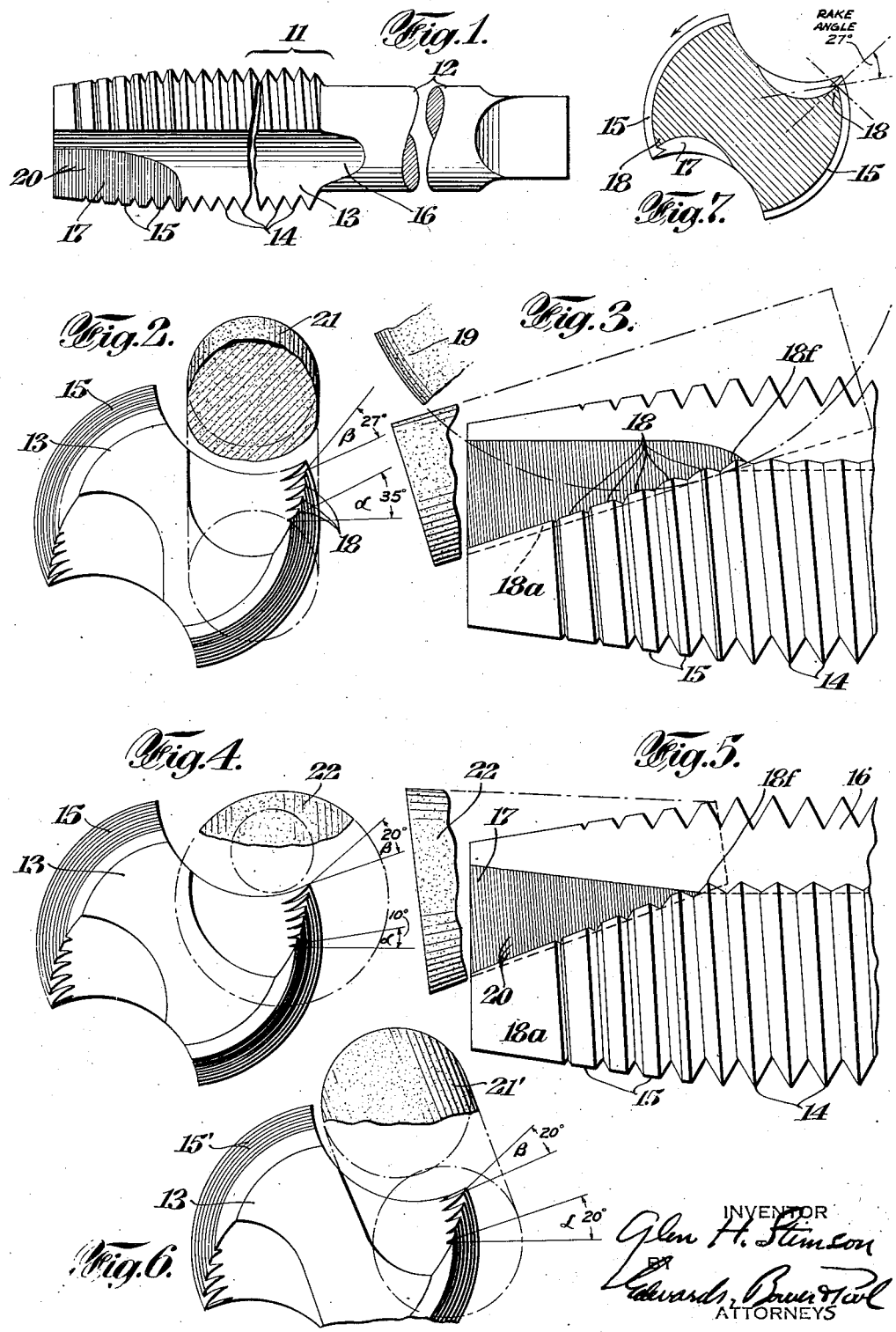

Patented June 24, 1941

2,246,865

UNITED STATES PATENT OFFICE 2,246,865

METHOD OF FORMING TAPS

Glen H. Stimson, Royal Oak, Mich., assignor to Greenfield Tap and Die Corporation, Greenfield, Mass., a corporation of Massachusetts Original application April 27, 1938, Serial No. 204,489. Divided and this application November 27, 1939, Serial No. 306,274

1 Claim. (Cl. 51—288)

This invention relates to threading taps and particularly to taps of the type generally known as gun taps in which the main flutes merge at the entering end with auxiliary or gun flutes extending at an angle. This arrangement provides an angled series of cutting teeth which project the chips forwardly along the gun flute and ahead of the tap. A tap of this type is shown in the patent to Wells, No. 1,165,822.

The general purpose of the invention is to improve the chip cutting and discharging action of a gun tap. More specifically, the invention includes improvements in the contour and relative angles of attack of the cutting teeth, the contour and surface of the gun flute, and the provision of means and methods for producing the desired construction and arrangement.

Other objects and advantages of the invention, including the construction and relative arrangement of parts, will appear from the following description considered in connection with the accompanying drawing, in which, Fig. 1 is a side view of a gun tap with parts broken away;

Fig. 2 is an end view from the left of Fig. 1 on an enlarged scale, showing the position of a grinding cylinder;

Fig. 3 is an enlarged fragmentary side view of the entering end of a gun tap indicating the position of the grinding cylinder and a grinding wheel;

Fig. 4 is a view similar to Fig. 2 indicating the position of a conical grinding wheel;

Fig. 5 is similar to Fig. 3, likewise showing the conical grinding wheel;

Fig. 6 is a view similar to Fig. 2 showing a different arrangement, and

Fig. 7 is a transverse sectional view of the tap shown in Fig. 3 indicating the rake angle of the cutting teeth.

The gun tap 11 includes the usual tap structure comprising shank 12 and lands 13 carrying leading threads 14 and cutting threads 15, which are shown as taper ground. Lands 13 are separated by the main longitudinal flutes 16 which are arcuate in cross section.

Each main flute 16 merges with a gun flute 17 extending downwardly from the main flute to the entering end of the tap when viewed as in Fig. 3. Each gun flute 17 extends across the entering ends of cutting threads 15, the angle between the surface of flute 16 and the radius from the axis of the tap to the apex of said end of a thread 15 constituting the rake or angle of attack of said thread as illustrated at alpha and beta in Figs. 2, 4 and 6. As said ends constitute the cutting instrumentalities of the tap they will be referred to herein for convenience as teeth 18.

With the arrangement shown in Figs. 2 and 3, the downward inclination of the flute 17 toward the tap end produces a progressively increasing width of the cylindrical portion of said flute, carrying teeth 18 progressively higher on the cylinder surface and therefore increasing correspondingly the rake of said teeth. As illustrated in Fig. 7 the rake angle of the cutting edge of the teeth 18 is the angle between the radius of the axis of the tap and the surface of the gun flute 17 at the apex of the tooth. This is to a certain extent balanced by the progressively reduced diameter of threads 15 due to the taper grind, where the tap is of this type; but in general, and in the arrangement shown, the rake of teeth 18 will still be progressively greater toward the tap end.

As illustrated in Fig. 2 the threads at the tap end have a rake alpha of substantially 35° while the threads at the root of the taper have a rake beta of about 27°.

The gun flute 17 may be formed by a milling cutter or disk grinding wheel having a cutting face that is semi-circular in cross section, traveling longitudinally of the tap in a suitable path, the path of the semi-circular edge portion of the forming device corresponding to the lower half of the above mentioned cylinder. A marginal portion of a properly positioned disk grinding wheel 19 of this type is indicated in Fig. 3.

This method of forming the gun flute tends to produce relatively inconspicuous but definite grooves and ridges extending longitudinally along the flute. While these grooves and ridges are so slight as to be apparently inconsequential in the operation of the tap 11, it has been discovered that if the gun flutes 17 are ground or polished so as to destroy the longitudinal grooves and ridges, the action of the tap in cutting and discharging the chips in the manner characteristic of such taps is materially improved. An improvement in such operation is likewise produced when similar relatively slight grooves or ridges 20 extend in a generally transverse or circumferential direction in gun flutes 17, as indicated diagrammatically in Fig. 1.

These results may conveniently be obtained by means of a cylindrical polishing or abrading tool such as the cylindrical grinding wheel 21 indicated in Figs. 2 and 3, the diameter of which is suitably proportioned to the desired cylindrical surface of gun flute 17; that is, if the cylindrical wheel 21 forms the final groove, it will have the same diameter as the cylinder of generation of the flute; whereas if it is intended primarily to surface or polish the flute, its diameter will be not greater than that of such cylinder. The use of the grinding wheel 21 will serve to destroy the longitudinal grooves and ridges in gun flute 17 and it may be constructed and operated to produce the circumferential grooves and ridges 20.

The rake of the cutting teeth 18 is of substantial importance, and seriously affects the efficiency and life of the tap. It has been found advantageous to shape the portion of the gun flute adjacent the teeth 18 to conform to the surface of a cylinder extending downwardly from the main flute 16 toward the end of the tap, and a gun flute 17 of desirable contour for expelling the chips in characteristic manner is provided when such cylinder lies tangent to a plane through the tap axis intersecting the flute 16 and is of such diameter that its outer face is not substantially beyond a plane tangent to outermost threads 14 and parallel to said axial plane. This arrangement is shown in Figs. 2 and 3. In this construction however the rake of cutting tooth 18a which ordinarily makes the first cut in the work is substantially greater than that of the final cutting tooth 18f. The efficiency of the tap depends to a substantial extent upon the effective operation of tooth 18f, whose apex is necessarily sharp. It is likewise important that the initial tooth 18a be given a proper rake, since its action particularly on relatively stringy metal is greatly enhanced thereby. A feature of the invention is to provide an arrangement in which both terminal teeth 18a and 18f may have the proper rake for their particular operations, the intermediate teeth 18 having a suitable intermediate rake. Another feature is the accomplishment of this object while retaining the desirable contour of the gun flute 17 suitable for efficient expulsion of the chips. Specifically, all of the teeth 18 may be given the same rake without seriously distorting the desired gun flute contour.

This may be accomplished by employing in the gun flute a grinding, abrading or cutting device having an effective conical surface arranged with the smaller diameter portion operating on the final cutting tooth 18f and the larger diameter portion effective along the initial cutting tooth 18a. With this system the increased diameter adjacent the initial teeth may be designed to compensate for the longer arc of contact already described in connection with Figs. 2 and 3, so that the desired widening of the gun flute 17 toward the tap end will be retained and at the same time a substantially uniform rake of all of the cutting teeth 18 will be produced. This embodiment is illustrated in Figs. 4 and 5, employing the conical grinding wheel 22.

This arrangement likewise may be employed to provide desired variations in rake between teeth 18a and 18f, by altering the taper of the grinding wheel or by varying the angular position of its surface at the intersection with the teeth 18. This is illustrated, for instance, in Fig. 4 where the end threads have a rake alpha of about 10° while the root threads have a rake beta of about 20°.

Variations in the rake of the cutting teeth within predetermined limits may be obtained by properly proportioning and and positioning the cylindrical grinding wheel 21' relative to the cutting teeth 18' as indicated in Fig. 6. With this arrangement the wheel corresponding to wheel 19 is suitably located with its cylindrical surface in final grinding position at the desired rake angle in the zone of engagement with cutting teeth 15', 18'a and 18'f, respectively. For instance, as illustrated in Fig. 6, the tip threads have a rake alpha of about 20° while the root threads have a similar rake beta of about 20°. While this arrangement permits the maintenance of a nearly uniform rake or a predetermined variation in rake between the end teeth, it also imposes restrictions on the size of the grinding wheel 21' and the resulting proportions of the gun flute 17' and in some cases the wheel 21' would be required to be shifted laterally during operation.

While a preferred arrangement has been illustrated, and has been shown substantially in correct relative proportions in the drawing, numerous modifications may be introduced without departing from the scope of the invention as set forth in the claims. For instance, while a tap with two flutes is shown in Figs. 1–6, any desired practicable number of flutes or the like may be employed. Likewise, wheels 21, 21' and 22 are not restricted to surfacing or polishing, but may be utilized to form or shape the gun flute.

This is a division of my application Serial No. 204,489, filed April 27, 1938, now Patent No. 2,202,236 granted May 28, 1940.

I claim:

A method of forming flutes in a tap which comprises cutting a main flute along the tap and a gun flute extending downwardly from the main flute to the entering end of the tap, and abrading the gun flute surface by means of a conical abrading wheel positioned with its base adjacent the end of the tap and forming the gun flute at progressively increasing diameters toward the end of the tap and having its surface at a substantially constant angle to the radii extending from the tap axis to the apices of the end teeth of the tap so that the angles of rake of said teeth along said gun flute are substantially the same.

GLEN H. STIMSON.